United States Patent [19]

Nakano et al.

[11] Patent Number: 4,722,817

[45] Date of Patent: Feb. 2, 1988

[54] METHOD FOR PRODUCTION OF CONTINUOUS CARBON FIBER REINFORCED SIC COMPOSITE

[75] Inventors: Kikuo Nakano; Hiroshi Hayashi; Nobumichi Ohnishi, all of Nagoya; Shigeo Nagasaki, Aichi, all of Japan

[73] Assignee: Agency of Industrial Science & Technology, Ministry of International Trade & Industry, Tokyo, Japan

[21] Appl. No.: 845,336

[22] Filed: Mar. 28, 1986

[30] Foreign Application Priority Data

Apr. 22, 1985 [JP] Japan .................................. 60-86033

[51] Int. Cl.$^4$ ............................................. C01B 31/00
[52] U.S. Cl. ................................ 264/29.5; 264/29.6; 264/136; 264/137; 423/447.5; 423/447.7; 427/376.2
[58] Field of Search ............... 264/29.5, 29.7, 29.2, 264/29.6, 134, 136, 137; 423/447.5, 447.8, 447.7; 427/372.2, 376.2, 377, 387

[56] References Cited

U.S. PATENT DOCUMENTS

| | | | |
|---|---|---|---|
| 3,385,723 | 5/1968 | Pickar | 264/29.5 |
| 4,067,955 | 1/1978 | Noakes et al. | 264/29.5 |
| 4,124,667 | 11/1978 | Coppola et al. | 264/29.5 |
| 4,152,381 | 5/1979 | Peterson | 264/29.5 |
| 4,215,161 | 7/1980 | Seibold et al. | 264/29.5 |
| 4,597,923 | 7/1986 | Kennedy et al. | 264/29.5 |

FOREIGN PATENT DOCUMENTS 58-95648  6/1983  Japan .

*Primary Examiner*—Jan H. Silbaugh
*Assistant Examiner*—Hubert C. Lorin
*Attorney, Agent, or Firm*—Oblon, Fisher, Spivak, McClelland, & Maier

[57] ABSTRACT

A continuous carbon fiber reinforced SiC composite is produced by a method which comprises impregnating continuous carbon fibers coated with a SiC or titanium compound with a slurry mixture of silicon or a silicon compound with a thermosetting resin or a high-carbon caking agent, molding the impregnated continuous carbon fibers in a prescribed shape to obtain a shaped impregnated article, then curing the shaped article, heating the shaped article to obtain a carbon fiber-carbon composite having SiC or titanium compound, further impregnating liquid Si into the composite and heating the impregnated composite.

8 Claims, No Drawings

METHOD FOR PRODUCTION OF CONTINUOUS CARBON FIBER REINFORCED SIC COMPOSITE

FIELD OF THE INVENTION AND RELATED ART STATEMENT

This invention relates to a method of the production of SiC ceramic articles highly useful as turbine blades for a ceramic gas turbine engine and as nozzles and heat exchangers for a space rocket, for example. More particularly, this invention relates to continuous carbon fiber reinforced SiC composites possessing high toughness and retaining strength intact at elevated temperatures up to 2000° C.

As widely known, SiC possesses high strength at elevated temperatures and, therefore, is useful for members in high-temperature structures. More often than not, this material is used in the form of sintered articles. Heretofore, various efforts have been made to reinforce SiC article for use as structural members with SiC fibers such as, for example, SiC whisker, SiC short fiber and SiC continuous fiber.

Among the known SiC fiber reinforced composites are, for example, monodirectionally reinforced silicon carbide ceramic articles (Japanese Patent Publication SHO No. 58(1983)-95648), SiC sintered articles reinforced with SiC whisker fibers [Glossary of Manuscripts for Meeting of Basic Ceramic Discussions (January, 1985)] and Japanese Patent Application SHO No. 60(1985)-38295 discloses a method for the production of continuous SiC fiber reinforced SiC composites. This method produces a SiC composite by impregnating SiC fibers with a slurry, drying and curing the impregnated SiC fibers, carbonizing the cured SiC fibers at a temperature around 1000° C., and impregnating liquid silicon into the carbonized article having SiC fibers at 1400° to 1500° C.

The methods described above are all aimed at enhancing the toughness of SiC ceramics by the addition of SiC fibers to ceramics. Especially for the impartation of high toughness, the production of continuous SiC fiber reinforced SiC ceramics is carried out as recited in the aforementioned Japanese Patent Application SHO 60(1985)38259. None of the continuous SiC fibers heretofore developed is capable of retaining its strength intact at elevated temperatures exceeding 1400° C. In the circumstances, there has developed a need for practicable fibers capable of retaining strength at such elevated temperatures.

Carbon fibers are capable of retaining strength at high temperatures (2000° C.) as compared with SiC fibers. When such carbon fibers are combined with a SiC matrix, the strength of the carbon fibers are degraded by a reaction which occurs between the matrix and the fibers. When continuous carbon fibers are used, it is necessary to curb the reaction of the carbon fibers with the matrix.

OBJECT AND SUMMARY OF THE INVENTION

This invention has been perfected to meet the need mentioned above. It is aimed at providing a method for the production of a continuous carbon fiber reinforced SiC composite which comprises continuous carbon fibers and a ceramic matrix and which is free from degradation.

To accomplish the object described above, this invention provides a method for the production of a continuous carbon fiber reinforced SiC composite, i.e. a carbon fiber-SiC matrix composite, which comprises impregnating continuous carbon fibers coated with at least one member selected from the group consisting of SiC, TiC, $TiB_2$, and TiN with a slurry mixture which comprises at least one member selected from the group consisting of SiC, $Si_3N_4$, $SiO_2$, and Si with a thermosetting resin or a high-carbon caking agent thereby obtaining impregnated continuous carbon fibers, then molding the impregnated continuous carbon fibers thereby obtaining a shaped article, curing the shaped article, subsequently heating the shaped article in an inert gas to make a carbon fiber-carbon composite having the interstices between the carbon fibers filled with carbon and the aforementioned silicon or silicon compound, further impregnating the carbon fiber-carbon composite with liquid Si, and thereafter heat treating the impregnated composite.

DETAILED DESCRIPTION OF THE PREFERRED EMBODIMENTS

The continuous carbon fiber reinforced SiC composite produced by the method of this invention is an integral body consisting of continuous carbon fibers and a SiC matrix.

Preparatory to forming the integral body consisting of continuous carbon fibers and the SiC matrix, the continuous carbon fibers are coated as with SiC, TiC, $TiB_2$, or TiN for the purpose of repressing the reaction between the SiC matrix and the continuous carbon fibers. The continuous carbon fibers which have been so coated with SiC, TiC, $TiB_2$, or TiN are inhibited from reacting with the SiC matrix and are consequently enabled to retain their strength intact at elevated temperatures.

Specifically, in this invention, the continuous carbon fibers coated with SiC, TiC, $TiB_2$, or TiN are molded in a prescribed shape or woven in the form of a fabric. The shaped article or woven fabric of continuous carbon fibers is then impregnated with a slurry mixture of a thermosetting resin such as phenol resin or furan resin or a high-carbon caking agent such as pitch or tar with a fine powder of SiC, $Si_3N_4$, $SiO_2$, or Si. The impregnated shaped article is cured and then carbonized in an inert gas (such as, for example, argon gas) to give rise to a carbon fiber composite having the interstices between adjacent fibers filled with carbon and the aforementioned fine powder. Subsequently, this composite is impregnated with liquid silicon and heat treated in an inert gas (such as, for example argon gas) at a temperature exceeding 1450° C. to effect conversion of the carbon matrix portion thereof into SiC. By this procedure, the continuous carbon fiber reinforced SiC composite can be produced. Thus, the SiC composite is capable of retaining its strength intact at elevated temperatures up to 2000° C.

The temperature at which the curing is carried out after the step of mixing the aforementioned thermosetting resin with silicon or the silicon compound generally is in the range of normal room temperature to 200° C., although it is variable with the kind of the thermosetting resin. From the practical point of view, the temperature of the carbonization after the step of the curing is in the range of 800° to 1300° C.

The coating of SiC, TiC, $TiB_2$, or TiN for the continuous carbon fibers to be used in the present invention is intended to curb the reaction of the carbon fibers with the SiC matrix as already mentioned. For this purpose, the coating is required to have a thickness of about 0.1 to 1 μm. The silicon or silicon compound content in the slurry prepared for the impregnation of the continuous carbon fibers is roughly in the range of 65 to 85% by weight. The SiC matrix content in the continuous fiber reinforced SiC composite to be produced by this invention is roughly in the range of 70 to 40% by volume. As a result, the composite finally produced by this invention is enabled to retain its strength at elevated temperatures up to 2000° C. as described above.

In the composite produced by the method of this invention, the fiber part thereof is formed of continuous carbon fibers coated with SiC, TiC, TiB$_2$, or TiN and the matrix part thereof is formed of SiC. The composite, therefore, possesses high toughness and retains its strength intact at elevated temperatures up to 2000° C. as compared with the conventional continuous SiC fiber reinforced SiC composite which is incapable of retaining strength intact at elevated temperatures exceeding 1400° C. It has higher strength and toughness than the conventional SiC ceramic composite and, therefore, is usable for such structural members as turbine blades for ceramic gas turbine engines and for nozzles and heat exchangers for rockets, for example.

Now, the present invention will be described more specifically with reference to working examples.

EXAMPLE 1

Continuous carbon fibers (7 μm in diameter, forming yarns at a rate of 3000 fibers per yarn) possessing a coating of SiC 1 μm in thickness were immersed in a liquid prepared by thoroughly stirring furan resin with about 1.6% by weight of a curing agent and about 20% by weight of β-SiC powder added thereto. Then, they were pulled out and wound on a yarn frame and cured at about 70° C. The fibers so wound on the frame and cured were then heated in argon gas gradually from room temperature to 1000° C. for carbonization. This carbonization process formed a carbon fiber-carbon composite comprising fibers arrayed in one direction and having the interstices between the fibers filled with carbon and fine powders. This composite was impregnated with liquid Si and heat treated in argon gas at 1550° C. for 3 hours to convert the carbon part into SiC and produce a continuous carbon fiber reinforced SiC composite, i.e. a carbon fiber-SiC matrix composite.

EXAMPLE 2

Continuous carbon fibers coated with SiC were immersed in a slurry formed by thoroughly stirring phenol resin with about 70% by weight of α-SiC powder and ethanol added thereto. Then, they were pulled out and wound on a yarn frame and cured at about 70° C. The cured fibers were removed from the frame and cut into rectangles of a suitable size (for example, 25 mm in width, 40 mm in length, and 5 mm in thickness). The rectangles so formed were fiber-resin composites comprising SiC-coated carbon fibers arrayed in one direction and having the interstices between the adjacent fibers filled with the phenol resin and α-SiC powder. They were then gradually heated in argon gas from room temperature to 1000° C. for carbonization. Consequently, composites comprising carbon fibers arrayed in one direction and having the interstices between adjacent carbon fibers filled with carbon and fine SiC powder were obtained. The composites were further impregnated with liquid Si in argon gas at 1550° C. for one hour to effect conversion of the carbon into SiC. Thus, a SiC composite sintered article reinforced with continuous carbon fibers was produced.

Then, the sample obtained above was cut into strips 3 mm×4 mm×32 mm and ground on all the surfaces to prepare a total of three test piece for toughness at rupture. The test pieces were tested for toughness at rupture ($K_{IC}$) in a direction perpendicular to the direction of length (direction of arrangement of fibers). The results are shown in Table 1.

TABLE 1

| $K_{IC}$ value of SiC composite sintered article reinforced with continuous carbon fibers | |
|---|---|
| Toughness at rupture ($K_{IC}$) [MN/m$^{3/2}$] | |
| Test piece 1 | 6.1 |
| Test piece 2 | 5.5 |
| Test piece 3 | 5.8 |

The $K_{IC}$ value obtained in the test far surpass the value (3.4 MN/m$^{3/2}$) reported on a non-reinforced sintered article.

EXAMPLE 3

A slurry was prepared by adding to pitch (softening point 86° C., fixed carbon content 47.7%, and volatile content 52.2%) 70% by weight of SiC powder and heating and stirring the resulting mixture at 90° to 100° C. SiC-coated carbon fibers were immersed in the slurry. They were pulled out and wound on a yarn frame and solidified by granual cooling. The carbon fiber/pitch composite thus obtained and removed from the frame was cut into rectangular pieces 25 mm in width, 40 mm in length, and 5 mm in thickness and gradually heated in argon gas to about 800° C. for expulsion of the volatile substances from the pitch. Consequently, a composite having the interstices between the adjacent carbon fibers filled with carbon and SiC was obtained. This composite was further heated in argon gas, impregnated with liquid Si at 1550° C. for one hour for conversion of the carbon in the matrix part thereof into SiC. Thus, a carbon fiber reinforced Si composite sintered article was obtained.

What is claimed is:

1. A method for the production of a continuous carbon fiber reinforced SiC composite posessing high toughness and retaining strength intact at elevated temperatures, which comprises impregnating continuous carbon fibers coated with at least one member selected from the group consisting of SiC, TiC, TiB$_2$, and TiN with a slurry comprising of at least one member selected from the group consisting of SiC, Si$_3$N$_4$, SiO$_2$, and Si with a thermosetting resin or a high-carbon caking agent thereby obtaining impregnated continuous carbon fibers, then molding said impregnated continuous carbon fibers thereby obtaining a shaped article, curing said shaped article, subsequently carbonizing said shaped article in an inert gas, thereby obtaining a carbon fiber-carbon composite having the interstices between said carbon fibers filled with carbon and at least one member selected from the group consisting of SiC, Si$_3$N$_4$, SiO$_2$, and Si and further impregnating said carbon fiber-carbon composite with liquid Si, and thereafter heat treating said impregnated composite.

2. The method according to claim 1, wherein said thermosetting resin is at least one member selected from the group consisting of phenol resin and furan resin.

3. The method according to claim 1, wherein said high-carbon caking agent is at least one member selected from the group consisting of pitch and tar.

4. The method according to claim 1, wherein said thermosetting resin has SiC powder admixed therewith.

5. The method according to claim 1, wherein said coated carbon fibers have a coating thickness of about 0.1–1 μm.

6. The method according to claim 1, wherein said slurry has a silicon or silicon compound content of about 65–85% by weight.

7. The method according to claim 1, wherein said curing is effected at a temperature of from room temperature to about 200° C.

8. The method according to claim 1, wherein said carbonizing, subsequent to curing, is effected at a temperature in the range of about 800°–1300° C.

* * * * *